United States Patent
Watanabe et al.

(10) Patent No.: US 10,895,651 B2
(45) Date of Patent: Jan. 19, 2021

(54) PET DEVICE AND METHOD OF ACQUIRING GAMMA RAY GENERATION POSITION USING SCATTERED COINCIDENCE WITH PET DEVICE

(71) Applicant: HAMAMATSU PHOTONICS K.K., Hamamatsu (JP)

(72) Inventors: Mitsuo Watanabe, Hamamatsu (JP); Takahiro Moriya, Hamamatsu (JP); Tomohide Omura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/407,455

(22) Filed: May 9, 2019

(65) Prior Publication Data
US 2019/0353808 A1    Nov. 21, 2019

(30) Foreign Application Priority Data
May 17, 2018 (JP) ................................ 2018-095599

(51) Int. Cl.
*G01T 1/20*    (2006.01)
*G01T 1/29*    (2006.01)

(52) U.S. Cl.
CPC ................... *G01T 1/2985* (2013.01)

(58) Field of Classification Search
CPC ....... G01T 1/2985; G01T 1/161; G01T 1/202; A61B 6/5258; A61B 6/037
See application file for complete search history.

(56) References Cited

U.S. PATENT DOCUMENTS

| | | |
|---|---|---|
| 7,166,848 B2 | 1/2007 | El-Hanany et al. |
| 7,208,740 B2 | 4/2007 | El-Hanany et al. |
| 8,384,036 B2 | 2/2013 | Conti |
| 9,638,811 B2 | 5/2017 | Iltis |

(Continued)

FOREIGN PATENT DOCUMENTS

| | | |
|---|---|---|
| JP | 2008-522168 A | 6/2008 |
| JP | 4588042 B2 | 11/2010 |
| WO | WO-2006/058432 A1 | 6/2006 |

(Continued)

OTHER PUBLICATIONS

Ilisie et al., "Improving PET sensitivity and resolution by photon Interaction sequence timing discrimination," 2017, IEEE Nuclear Science Symposium and Medical Imaging Conference, pp. 1-4. (Year: 2017).*

(Continued)

*Primary Examiner* — Kiho Kim
(74) *Attorney, Agent, or Firm* — Faegre Drinker Biddle & Reath LLP (57) ABSTRACT

A PET device includes detectors including detector signal processing units and a data processing circuit configured to acquire a gamma ray generation position. The detector signal processing unit includes a Compton cone estimating unit configured to estimate incidence directions of gamma rays detected by a pair of detectors as a first and second Compton cones. The data processing unit includes: a coincidence acquiring unit; a scattering surface estimating unit; an intersection line determining unit; an intersection point determining unit; and a gamma ray generation position.

11 Claims, 7 Drawing Sheets

(56) References Cited

U.S. PATENT DOCUMENTS

2009/0121141 A1* 5/2009 Eriksson ............... G01T 1/202
250/363.04
2018/0252825 A1* 9/2018 Benlloch Baviera ..... G01T 1/17

FOREIGN PATENT DOCUMENTS

WO    WO-2015/077164 A1    5/2015
WO    WO-2016/185123 A1    11/2016

OTHER PUBLICATIONS

Studen et al., "First coincidences in pre-clinical Compton camera prototype for medical imaging," 2004, Nuclear Instruments and Methods in Physics Research A, vol. 531, pp. 258-264. (Year: 2004).*

Yamaya et al., "Concrete realization of the whole gamma imaging concept," 2017, IEEE Nuclear Science Symposium and Medical Imaging Conference, 3 pages. (Year: 2017).*

Hamidreza Hemmati et al., Compton scatter tomography in TOF-PET, Physics in Medicine & Biology, 2017, pp. 7641-7658, vol. 62.

Mitsuo Watanabe et al., "Performance evaluation of a high-resolution brain PET scanner using four-layer MPPC DOI detectors," Physics in Medicine & Biology, 2017, pp. 7148-7166, vol. 62.

Maurizio Conti et al., "Reconstruction of scattered and unscattered PET coincidences using TOF and energy information", Physics in Medicine and Biology, 57 N307, 2012.

* cited by examiner

PET DEVICE AND METHOD OF ACQUIRING GAMMA RAY GENERATION POSITION USING SCATTERED COINCIDENCE WITH PET DEVICE

CROSS REFERENCE TO RELATED APPLICATION

This application claims the priority benefit of Japanese Application, JP2018-095599 filed on May 17, 2018, the disclosure of which is hereby incorporated by reference in its entirety.

TECHNICAL FIELD

The disclosure relates to a PET device and a method of acquiring a gamma ray generation position using scattered coincidence with a PET device.

BACKGROUND

In observation of a biological function and diagnosis of a malignant tumor, and the like, a positron emission tomography (PET) device that performs PET is used. In a nuclear medicine imaging device illustrated in Japanese patent No. 4588042, an embodiment in which a generation site of gamma rays (gamma ray generation position) is estimated by estimating an incidence direction of the gamma rays using kinematics of Compton scattering in addition to determination of coincidence of annihilation gamma rays (hereinafter, simply referred to as "gamma rays") is disclosed. In Japanese patent No. 4588042, in accordance with the estimation of a gamma ray generation position described above, accidental coincidence and scattered coincidence are eliminated as noise.

In addition, in a PET device illustrated in a non-patent document (Hamidreza Hemmati, et al., "Compton scatter tomography in TOF-PET," Phys. Med. Biol. 62 7641 (2017)), an embodiment in which a scattering surface and a gamma ray incidence direction are estimated on the basis of energy information and information of coincidence acquired by a detector is disclosed. In addition, in the non-patent document described above, a gamma ray generation position is estimated on the basis of the estimation described above and time of flight (TOF) information. A gamma ray generation position in the non-patent document 1 described above is estimated through calculation of a Monte Carlo simulation from lots of candidates representing a circular shape.

As described above, in Japanese patent No. 4588042, accidental coincidence and scattered coincidence are simply eliminated as noise. In contrast to this, in the non-patent document described above, substantial improvement of sensitivity may be achieved by estimating a gamma ray generation position using scattered coincidence. In this way, realization of high-definition image capturing may be achieved. However, in a case in which a gamma ray generation position is estimated from lots of candidates with high accuracy using the technique disclosed in the non-patent documents described above, a long calculation time shall be required.

SUMMARY

According to one aspect of the present disclosure, there is provided a method of acquiring a gamma ray generation position using a scattered coincidence with a positron emission tomography (PET) device, the method including: detecting gamma rays using a pair of detectors arranged on a periphery of a subject, the subject being interposed between the pair of detectors; estimating incidence directions of gamma rays detected by the pair of detectors as first and second Compton cones; acquiring coincidence information of the gamma ray detected by the pair of detectors; estimating a scattering surface of the gamma rays on the basis of energy information of the gamma rays and a measurement line of the coincidence based on the coincidence information; determining presence/absence of an intersection line at which surfaces of the first and second Compton cones overlap each other; determining presence/absence of an intersection point at which the intersection line and the scattering surface intersect each other, when the intersection line is present and none of the first and second Compton cones overlaps the measurement line of the coincidence; and calculating a measurement line of scattered coincidence on the basis of the intersection point and acquiring a gamma ray generation position on the basis of the measurement line of the scattered coincidence and TOF information of the gamma rays, when the intersection point is present.

According to the acquisition method with the PET device, when it is determined that the intersection point is present, the scattered coincidence can be used as data for acquiring a gamma ray generation position. In this way, compared to a case in which all the scattered coincidences are simply eliminated as noise, the sensitivity of the detector is substantially improved. In addition, for example, when there is one point as an intersection point, a gamma ray generation position can be estimated using the information of scattered coincidence that is directly measured without requiring calculation through a Monte Carlo simulation or the like in which complex conditions such as the shape of the subject, a ray source distribution, and the like are taken into account. Therefore, according to the acquisition method described above, a high-definition image can be captured in a short time.

A gamma ray generation position may be acquired on the basis of the TOF information and the measurement line of the coincidence, when the intersection line is present and the intersection line and the measurement line of the coincidence overlap each other. In such a case, since true coincidence can be clearly selected, a higher-definition image can be captured.

The determining presence/absence of the intersection point, the calculating a measurement line of the scattered coincidence, and the acquiring a gamma ray generation position may not be performed when it is determined that the intersection line is not present. In such a case, an unnecessary accidental coincidence can be eliminated as noise, and accordingly, a high-definition image can be captured.

The calculating a measurement line of the scattered coincidence and the acquiring a gamma ray generation position may not be performed when it is determined that the intersection point is not present. In such a case, an unnecessary scattered coincidence can be eliminated as noise, and accordingly, a high-definition image can be captured.

According to another aspect of the present disclosure, there is provided a PET device including: detectors arranged on a periphery of a subject, each of the detectors includes a signal processing unit, and the subject being interposed between a pair of the detectors in the detectors; a data processing unit configured to acquire a gamma ray generation position on the basis of information detected by the detectors, wherein the signal processing unit includes a Compton cone estimating unit configured to estimate incidence directions of gamma rays incident on the pair of detectors as first and second Compton cones, and the data processing unit includes: a coincidence acquiring unit configured to acquire coincidence information of the gamma rays detected by the pair of detectors; a scattering surface estimating unit configured to estimate a scattering surface of the gamma rays on the basis of energy information of the gamma rays and a measurement line of coincidence based on the coincidence information; a intersection line determining unit configured to determine presence/absence of a intersection line at which surfaces of the first and second Compton cones overlap each other; an intersection point determining unit configured to determine presence/absence of an intersection point at which the intersection line and the scattering surface intersect each other, when the intersection line is present and none of the first and second Compton cones overlaps the measurement line of the coincidence; a coincidence line calculating unit configured to calculate a measurement line of scattered coincidence on the basis of the intersection point when the intersection point is present; and a gamma ray generation position acquiring unit configured to acquire a gamma ray generation position on the basis of the measurement line of the scattered coincidence and the TOF information of the gamma rays when the intersection point is present.

According to this PET device, when it is determined by the intersection point determining unit that the intersection point is present, the gamma ray generation position acquiring unit can use the scattered coincidence as data for acquiring a gamma ray generation position. In this way, compared to a case in which all the scattered coincidences are simply eliminated as noise, the sensitivity of the detector is substantially improved. In addition, for example, when it is determined that there is one point as the intersection point, the gamma ray generation position acquiring unit can estimate a gamma ray generation position using the information of scattered coincidence without requiring calculation through a Monte Carlo simulation or the like in which complex conditions such as the shape of the subject, a ray source distribution, and the like are taken into account. Therefore, according to the PET device described above, a high-definition image can be captured in a short time.

Each of the detectors may include gamma ray detecting units stacked in the incidence direction of the gamma rays, and each of the gamma ray detecting units includes a scintillator and an optical sensor array. In such a case, detection performance such as position resolution and time resolution of a gamma ray and the like in each detector can be improved.

A thickness of the scintillator may be thinner as the scintillator is positioned closer to the subject. In such a case, in addition to the high time resolution performance, the resolution of the Compton cone estimated by the Compton cone estimating unit can be improved.

The scintillators may include the same material, and the material may include an LSO:Ce crystal or an LYSO:Ce crystal. In such a case, the sensitivity of the scintillators for a gamma ray can be improved while the manufacturing cost is reduced.

Each of the gamma ray detecting units may include a first scintillator and a second scintillator, the first scintillator being closer to the gamma ray generation position than the second scintillator, and a Compton scattering ratio of the first scintillator may be higher than a Compton scattering ratio of the second scintillator. In addition, the first scintillator may include a LaBr$_3$:Ce crystal, and the second scintillator may include an LSO:Ce crystal or an LYSO:Ce crystal. In such a case, the Compton scattering ratio can be improved in first the scintillator, and the sensitivity of the second scintillator can be improved.

The thicknesses of the scintillators may be equal to or larger than 2 mm and are equal to or smaller than 5 mm. In such a case, sufficient coincidence timing resolution can be acquired. In addition, the sensitivity for a gamma ray can be secured, and the Compton cone can be estimated well.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Hereinafter, a preferred embodiment according to one aspect of the present disclosure will be described in detail with reference to the accompanying drawings. In the following description, the same reference signs are assigned to elements having the same elements or the same functions, and duplicate description will not be presented.

Figure 1A:
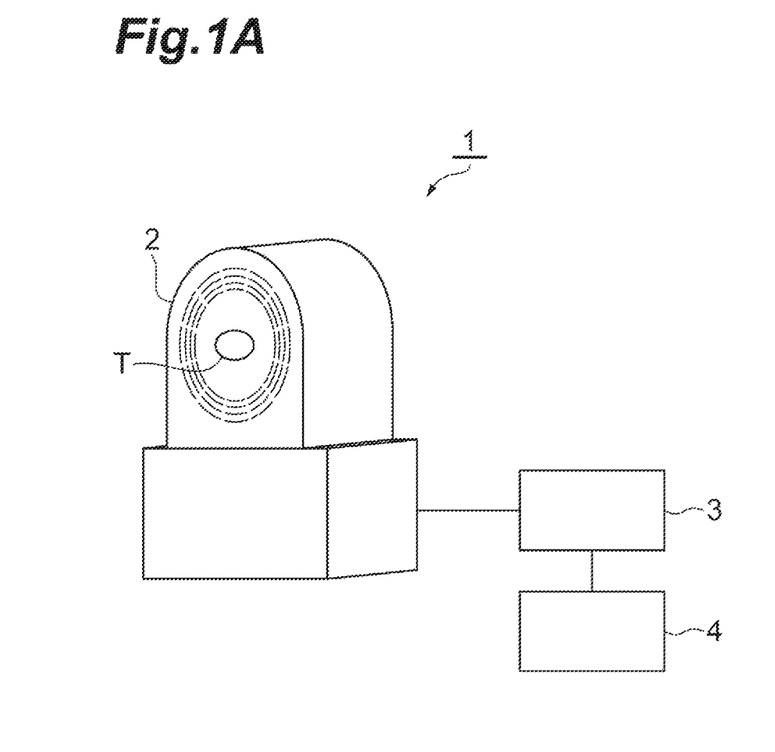
FIG. 1A is a schematic diagram of a positron emission tomography (PET) device according to this embodiment.
Figure 1B:
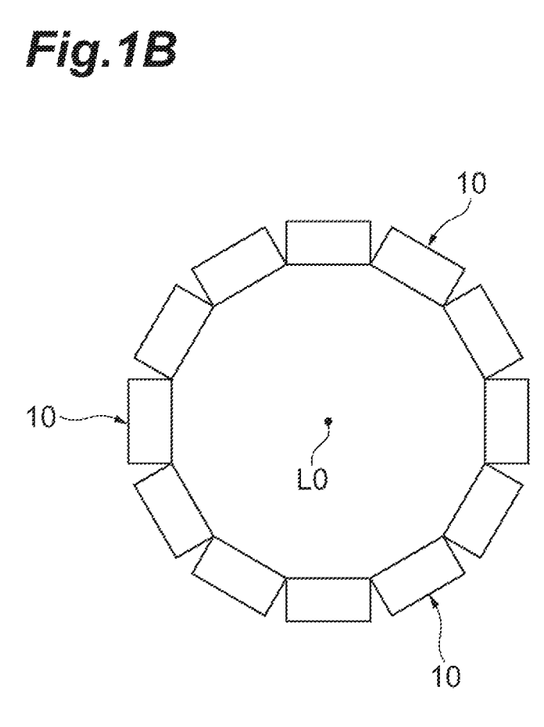
FIG. 1B is a schematic diagram of a detector ring of a PET device.

FIG. 1A is a schematic diagram of a positron emission tomography (PET) device according to this embodiment. FIG. 1B is a schematic diagram of a detector ring of a PET device. The PET device 1 illustrated in FIG. 1A is a device that detects radioactive rays emitted from a test object (subject) T. The test object T, for example, is an organism or an object to which medicine labeled by a positron radiation nuclide (a radioactive isotope for discharging positrons) is administered. According to the PET device 1, tomographic images of a test object T at a plurality of slice positions can be acquired on the basis of detected radioactive rays.

The PET device 1 includes a bed (not illustrated in the drawing) on which a test object T is placed, a gantry 2 having an opening of which the cross-section represents a circular shape, a data processing unit 3 to which data detected by the detector ring inside the gantry 2 is transmitted, and an image processing unit 4 that reconfigures an image on the basis of data processed by the data processing unit 3. As illustrated in FIG. 1B, in the detector ring inside the gantry 2 of the PET device 1, a plurality of radiation position detectors (detectors) 10 are arranged in a ring shape on a circumference having a predetermined line L0 as its center line. In the detector ring, radiation position detectors 10 adjacent to each other come into contact with each other. When gamma rays discharged from a test object T are detected by the PET device 1, the test object T is positioned inside the opening of the gantry 2. At this time, a plurality of radiation position detectors 10 are arranged on the periphery of the test object T.

Figure 2:
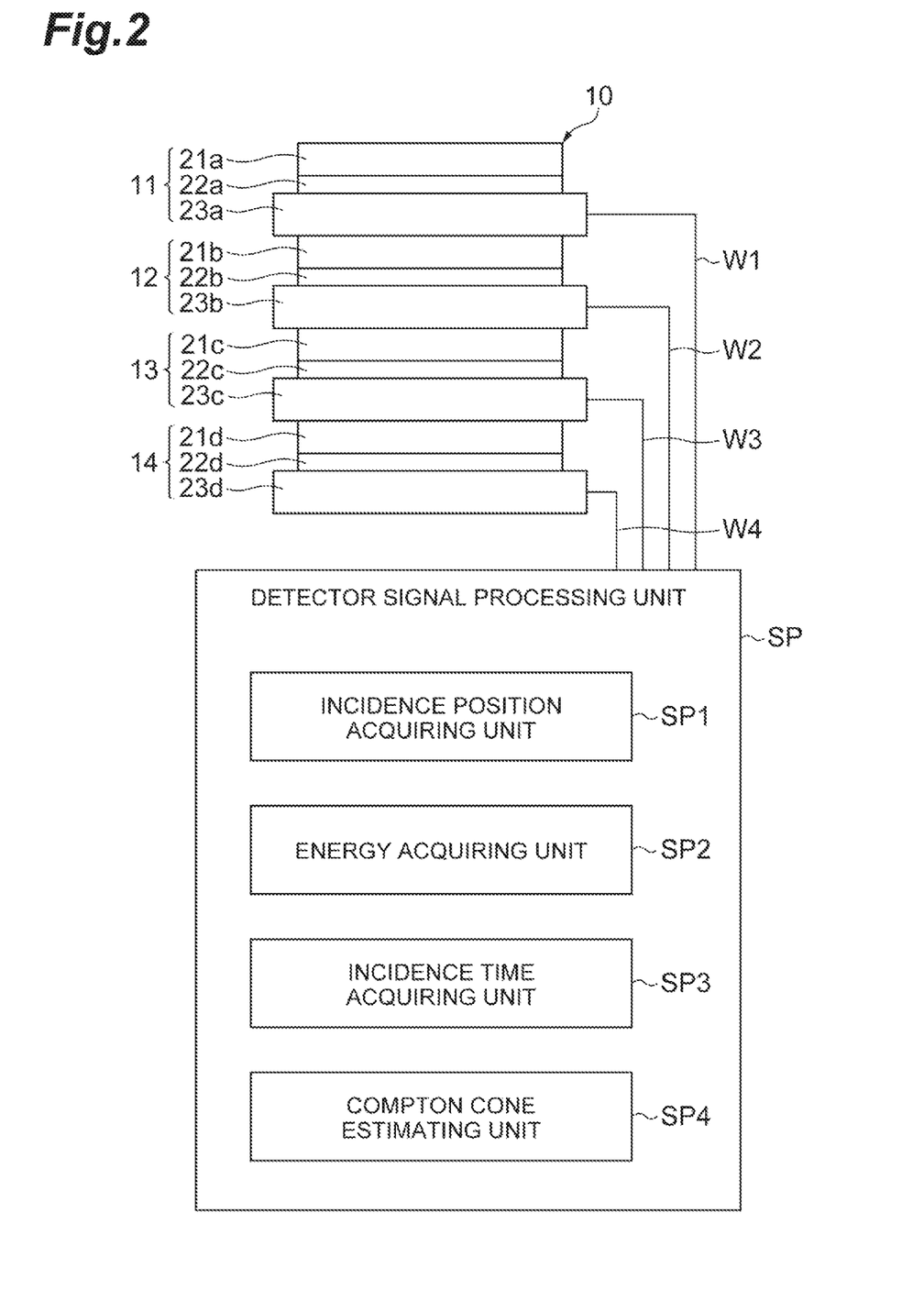
FIG. 2 is a configuration diagram of a radiation position detector and a detector signal processing unit.

FIG. 2 is a configuration diagram of a radiation position detector and a detector signal processing unit. The radiation position detector 10 illustrated in FIG. 2 is a sensor that is used for acquiring an incidence position, incidence energy, an incidence time, and an incidence direction of incident gamma rays. The radiation position detector 10 includes gamma ray detecting units 11 to 14 using a depth of interaction (DOI) technology and a detector signal processing unit (a signal processing unit) SP that processes signals transmitted from the gamma ray detecting units 11 to 14. The gamma ray detecting units 11 to 14 are devices for detecting incident gamma rays and generating electrical signals and are stacked together in an incidence direction of the gamma rays. The gamma ray detecting unit 11 is disposed at a position closest to a test object T, and the gamma ray detecting unit 14 is disposed at a position farthest from the test object T. In FIG. 2, the gamma ray detecting units 11 to 14 are illustrated as a side-face diagram, and the detector signal processing unit SP is illustrated as a block diagram. Hereinafter, a direction in which the gamma ray detecting units 11 to 14 are stacked together will be simply referred to as a "stacking direction" or "an incidence direction of gamma rays."

The gamma ray detecting unit 11 includes a scintillator 21a, an optical sensor array 22a, and a printed circuit board 23a.

The scintillator 21a includes a plurality of scintillator units (not illustrated in the drawing) that are members generating scintillation light in accordance with absorption of gamma rays and are two-dimensionally arranged in a direction orthogonal to the stacking direction. The plurality of scintillator units, for example, are arranged in a matrix pattern. The scintillator units may be physically separate from each other or may be optically separate from each other through a laser processing treatment. In a case in which the scintillator units are physically separate from each other, a light shielding layer may be disposed between the scintillator units adjacent to each other. In view of securing the sensitivity of gamma rays and estimating a Compton cone well, the thickness of the scintillator 21a, for example, is equal to or greater than 2 mm. In addition, from a viewpoint of acquiring a sufficient coincidence timing resolution (CTR), the thickness of the scintillator 21a, for example, is equal to or smaller than 5 mm. The sufficient CTR, for example, is equal to or smaller than 100 ps. A material composing scintillator 21a, for example, is an LSO:Ce crystal, an LYSO:Ce crystal, a $LaRr_3$:Ce crystal, or the like. In view of a cost and sensitivity of gamma rays, the scintillator 21a may be composed of an LSO:Ce crystal or an LYSO:Ce crystal. In view of a satisfactory CTR and a satisfactory Compton scattering ratio, the scintillator 21a may be composed of a $LaBr_3$:Ce crystal.

The optical sensor array 22a includes a plurality of optical sensors (not illustrated in the drawing) that are members detecting scintillation light generated by the scintillator 21a and are two-dimensionally arranged in a direction orthogonal to the stacking direction. The optical sensors are disposed in correspondence with each of the scintillator units of the scintillator 21a. In this embodiment, the optical sensor array 22a is a multi-pixel photon counter (MPPC). A pitch of the sensors, for example, is equal to or larger than about 1 mm and equal to or smaller than about 4 mm.

The printed circuit board 23a is a member that processes light detected by the optical sensor array 22a as an electrical signal. The printed circuit board 23a, for example, includes an amplification circuit, a converter, and the like. An electrical signal processed by the printed circuit board 23a is transmitted to the detector signal processing unit SP through a wiring W1. The printed circuit board 23a combines outputs from cathodes of the optical sensors as a digital signal acquired by pick-off of the timings thereof (a timing pick-off signal) and transmits the timing pick-off signal to the detector signal processing unit SP. In addition, the printed circuit board 23a converts outputs from anodes of the optical sensors into analog signals (4ch analog signals) converted into four outputs for which gravity center calculation can be performed and transmits the 4ch analog signals to the detector signal processing unit SP. Furthermore, the wiring W1, for example, is a flexible flat cable (FFC).

The gamma ray detecting units 12 to 14, similar to the gamma ray detecting unit 11, respectively include corresponding scintillators 21b to 21d, corresponding optical sensor arrays 22b to 22d, and corresponding printed circuit boards 23b to 23d. The scintillators 21b to 21d have similar configurations to the scintillator 21a. The optical sensor arrays 22b to 22d have similar configuration to the optical sensor array 22a. The printed circuit boards 23b to 23d have a configuration similar to the printed circuit board 23a and are respectively connected to the detector signal processing unit SP through corresponding wirings W2 to W4.

In the gamma ray detecting units 11 to 14, the thicknesses of the scintillators 21a to 21d may be the same or may be different from each other. Alternatively, the thicknesses of some of the scintillators 21a to 21d may be different from those of the others. In a case in which the thicknesses of the scintillators 21a to 21d are different from each other, a scintillator that is closer to the test object T may be thinner. In other words, in the gamma ray detecting units 11 to 14, the thickness of the scintillator 21a may be the thinnest, and the thickness of the scintillator 21d may be the thickest. In a case in which the thickness of a scintillator is thin, satisfactory TOF information can be acquired. Furthermore, the sensitivity and the time resolution performance of the radiation position detector 10 can be adjusted in accordance with specifications of the PET device 1. In addition, the thicknesses of the scintillators 21b to 21d may be larger than 5 mm. Furthermore, the scintillators 21a to 21d may be composed of the same material or may be composed of different materials. In addition, some scintillators 21a to 21d may be composed of a material different from that of the other scintillators. In a case in which the scintillators are composed of the same material, the material, for example, is composed of an LSO:Ce crystal or an LYSO:Ce crystal. In a case in which materials composing the scintillators 21a to 21d are different from each other or in a case in which some scintillators are composed of a material different from a material of the other scintillators, for example, a Compton scattering ratio of a scintillator positioned on a side close to a gamma ray generation position (for example, a predetermined part of the test object T) may be set higher than a Compton scattering ratio of a scintillator positioned on a side far from the gamma ray generation position. More specifically, a scintillator positioned on a side close to the gamma ray generation position may be composed of a $LaBr_3$:Ce crystal, and a scintillator positioned on a side far from the gamma ray generation position may be composed of an LSO:Ce crystal or an LYSO:Ce crystal. In such a case, the Compton scattering ratio may be improved in a scintillator positioned on a side close to the gamma ray generation position, and the sensitivity of gamma rays may be improved in a scintillator positioned on a side positioned far from the gamma ray generation position. In addition, in this embodiment, although scintillators positioned on the side close to the gamma ray generation position are the scintillators 21a and 21b, and scintillators positioned on the side far from the gamma ray generation position are the scintillators 21c and 21d, the scintillators are not limited thereto. A scintillator positioned on the side close to the gamma ray generation position may be only the scintillator 21a, and a scintillator positioned on the side far from the gamma ray generation position may be only the scintillator 21d.

The detector signal processing unit SP is a signal processing circuit that acquires (calculates) incidence position information of gamma rays, incidence energy information of gamma rays, incidence time information of gamma rays, and incidence angle information of gamma rays from signals generated by the gamma ray detecting units 11 to 14. Hereinafter, the functional configuration of the detector signal processing unit SP illustrated in FIG. 2 will be described. The detector signal processing unit SP illustrated in FIG. 2 includes an incidence position acquiring unit SP1, an energy acquiring unit SP2, an incidence time acquiring unit SP3, and a Compton cone estimating unit SP4.

The incidence position acquiring unit SP1 acquires incidence position information of gamma rays incident on the radiation position detector 10. The incidence position acquiring unit SP1 acquires incidence position information of gamma rays from each of the gamma ray detecting units 11 to 14. The incidence position acquiring unit SP1, for example, converts 4ch analog signals received from the printed circuit boards 23a to 23d into digital signals and performs gravity center calculation using the digital signals. Accordingly, the incidence position acquiring unit SP1 acquires incidence position information of gamma rays incident on each of the gamma ray detecting units 11 to 14. This incidence position information, for example, corresponds to position information of scintillator segments detected by the scintillators 21a to 21d.

The energy acquiring unit SP2 acquires energy information of gamma rays incident on the radiation position detector 10. The energy acquiring unit SP2 acquires energy information of gamma rays from each of the gamma ray detecting units 11 to 14. At this time, the energy acquiring unit SP2 performs a correction such that relative values of energy acquired by the gamma ray detecting units 11 to 14 coincide with each other. The energy acquiring unit SP2, for example, converts 4ch analog signals received from the printed circuit boards 23a to 23d into digital signals and acquires a total sum of the digital signals, thereby acquiring energy information of gamma rays.

The incidence time acquiring unit SP3 acquires incidence time information of gamma rays incident on the radiation position detector 10. The incidence time acquiring unit SP3 acquires incidence time information of gamma rays from each of the gamma ray detecting units 11 to 14. At this time, the incidence time acquiring unit SP3 performs a correction of a delay time according to a difference in the positions of the gamma ray detecting units 11 to 14, a difference in the thicknesses of the scintillators 21a to 21d, a difference in the lengths of the wirings W1 to W4, and the like. The incidence time acquiring unit SP3, for example, converts timing pick-off signals received from the printed circuit boards 23a to 23d into incidence time data of gamma rays using a time-to-digital converter (TDC) circuit.

The Compton cone estimating unit SP4 estimates an incidence direction of gamma rays incident on each radiation position detector 10 as a Compton cone. The Compton cone estimating unit SP4 estimates an incidence direction of gamma rays incident on the radiation position detector 10 as a Compton cone that is a conic surface having an angle (scattering angle) on the basis of information of energy added to electrons in accordance with Compton scattering, energy of scattered gamma rays, a place at which Compton scattering occurs, and a place at which the scattered gamma rays are photo-electrically absorbed. The angle resolution of the estimated Compton cone, for example, is equal to or smaller than 5 degrees.

A Compton cone is an area representing a direction in which one photon of a gamma ray flies. Compton scattering of a photon is a phenomenon in which a photon causes elastic scattering with an electron. In a case in which energy of a photon is high (for example, in a case in which energy of a photon is 511 keV), forward scattering is dominant. For this reason, in this embodiment, a place at which Compton scattering has occurred is set as a first interaction point (FIP) by a detector closest to a test object T among detectors that have detected gamma rays, and a Compton cone is estimated using the FIP. The FTP may be calculated on the basis of a relation between energies of a recoil electron and of scattered gamma rays and a scattering angle in Compton scattering.

The data processing unit 3 is a signal processing circuit that acquires (calculates) generation site information of gamma rays (a gamma ray generation position) in a test object T from a signal generated by the radiation position detector 10. The data processing unit 3, for example, is an electronic control unit that includes a central processing unit (CPU), a read only memory (ROM), a random access memory (RAM), and the like. Such a data processing unit 3, for example, loads a program stored in the ROM into the RAM and executes the program loaded in the RAM using the CPU, thereby realizing various functions.

Figure 3:
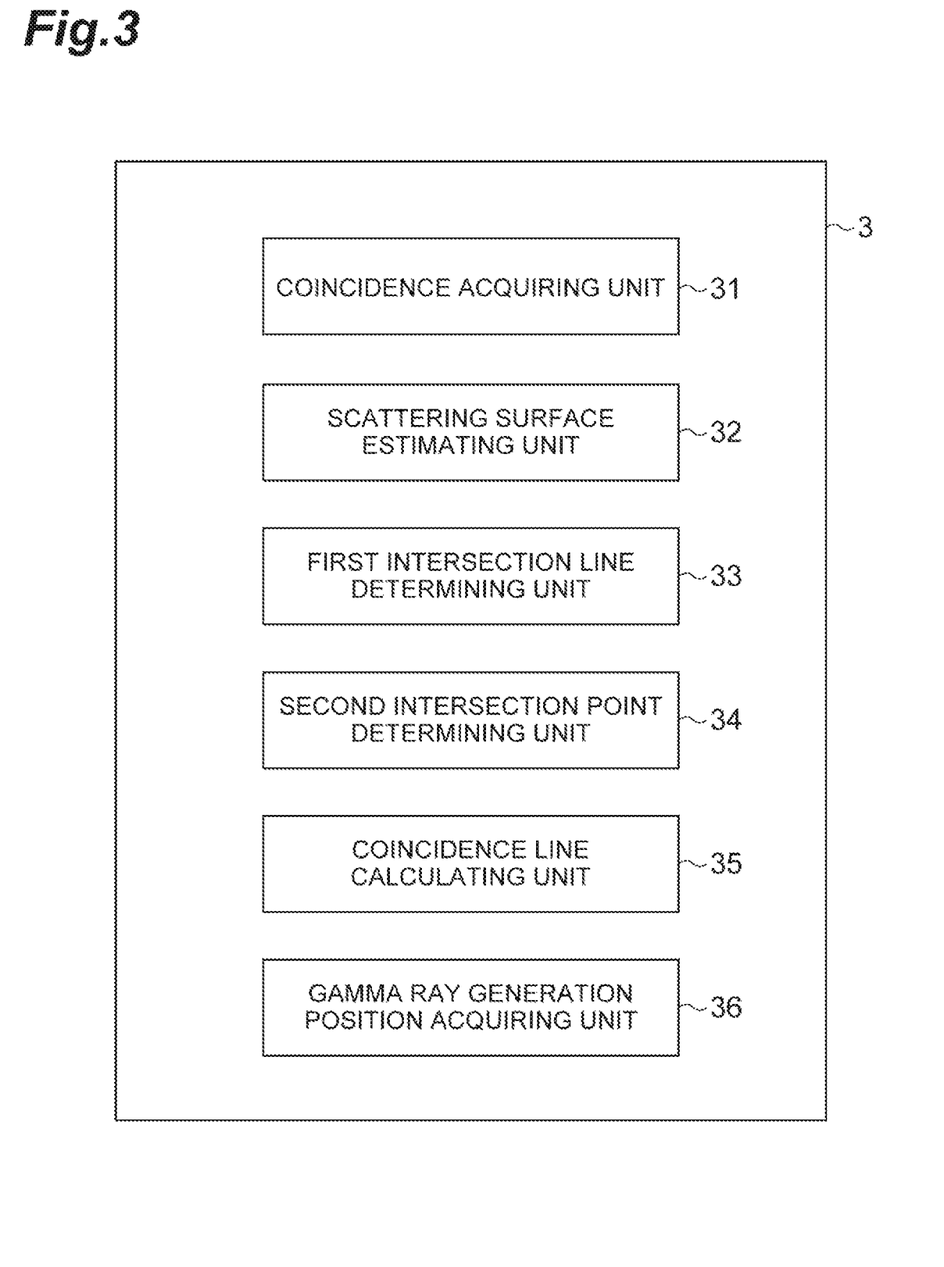
FIG. 3 is a block diagram illustrating a data processing unit.

Next, the functional configuration of the data processing unit 3 will be described with reference to FIG. 3. FIG. 3 is a block diagram illustrating the data processing unit. The data processing unit 3 illustrated in FIG. 3 includes a coincidence acquiring unit 31, a scattering surface estimating unit 32, a first intersection line determining unit 33, a second intersection point determining unit 34, a coincidence line calculating unit 35, and a gamma ray generation position acquiring unit 36.

The coincidence acquiring unit 31 acquires coincidence information of gamma rays detected by each radiation position detector 10. The coincidence information is information that represents an event of detecting gamma rays using two radiation position detectors 10 within a predetermined time width. For this reason, the coincidence acquiring unit 31 first determines whether or not radiation position detectors 10 have detected gamma rays simultaneously or within the predetermined time width on the basis of electrical signals transmitted from the radiation position detectors 10. In a case in which a result of the determination described above is "Yes," information of the gamma rays transmitted from the radiation position detectors 10 is acquired. Then, the coincidence acquiring unit 31 calculates a measurement line LOR1 of the coincidence (see FIG. 4 and the like to be described later) on the basis of the acquired information of coincident gamma rays. Here, the predetermined time width, for example, is within $8 \times 10^{-9}$ seconds.

The scattering surface estimating unit 32 estimates a scattering surface of gamma rays on the basis of the measurement line of the coincidence calculated on the basis of the coincidence information and energy information of gamma rays incident on the radiation position detectors 10. The scattering surface estimating unit 32, for example, estimates a scattering surface SS of gamma rays (see FIG. 4 to be described later) on the basis of the energy information of gamma rays acquired by a pair of radiation position detectors 10 having the test object T interposed therebetween and the measurement line LOR1 of coincidence. As a specific example, the scattering surface estimating unit 32 calculates a scattering angle θab from energy Ea acquired from one radiation position detector 10 that has detected gamma rays that have not been scattered and energy Eb acquired from the other radiation position detector 10 that has detected gamma rays that have been scattered once at an arbitrary position (scattering position). Then, by drawing all the positions at which the scattering angle θab is satisfied along detection positions of the pair of radiation position detectors 10, a scattering surface SS that is a long ellipsoid surface is estimated. The scattering surface SS corresponds to an area denoted by a broken line in FIG. 4. The scattering angle θab is represented using an equation "θab=cos$^{-1}$(2−Ea/Eb)." Here, the energy Ea corresponds to 511 keV that is still mass energy of an electron. The energy Eb, for example, is higher than ⅓ of the energy Ea and is lower than the energy Ea.

The first intersection line determining unit 33 determines presence/absence of an intersection line (first intersection line) at which the surfaces of the estimated Compton cones overlap each other. The first intersection line determining unit 33, for example, determines presence/absence of a first intersection line CL1 (see FIG. 4 to be described later) at which the surfaces of a first Compton cone CCA and a second Compton cone CCB (see FIG. 4 to be described later), which have been estimated by one pair of radiation position detectors 10 having the test object T interposed therebetween, overlap each other. The first intersection line may represent a linear shape or a point shape. In addition, in a case in which this first intersection line or one of the first and second Compton cones CCA and CCB coincides with the measurement line of the coincidence, the coincidence line is regarded as a true coincidence line that has not been scattered. In such a case, a gamma ray generation position is acquired on the basis of the measurement line and TOF information.

The second intersection point determining unit 34 determines presence/absence of a second intersection point at which the first intersection line and the scattering surface intersect each other, when the first intersection line is present and each of the Compton cones does not overlap the measurement line of the coincidence. For example, in a case in which the first intersection line CL1 is present, and both the first and second Compton cones CCA and CCB do not overlap the measurement line LOR1, of the coincidence, the second intersection point determining unit 34 determines presence/absence of a second intersection point CP2 (see FIG. 4 to be described later) at which the first intersection line CL1 and the scattering surface SS intersect each other. This second intersection point is estimated as a Compton scattering point. In a case in which the first intersection line is not present, the second intersection point determining unit 34 does not determine presence/absence of the second intersection point. In such a case, the data processing unit 3 determines gamma rays detected by the pair of the radiation position detectors 10 as accidental coincidence. Alternatively, in a case in which at least one of the first and second Compton cones CCA and CCB overlap the measurement line LOR1 of the coincidence, the second intersection point determining unit 34 does not determine presence/absence of the second intersection point. In such a case, the coincidence acquired by the coincidence acquiring unit 31 is regarded as a true coincidence. In this embodiment, at least one of the first and second Compton cones CCA and CCB overlapping the measurement line LOR1 may be the entire measurement line LOR1 overlapping at least one of the first and second Compton cones CCA and CCB.

The coincidence line calculating unit 35 calculates a measurement line of scattered coincidence from the second intersection point, when it is determined that the second intersection point is present. For example, in a case in which the second intersection point CP2 is present, the coincidence line calculating unit 35 calculates a measurement line LOR2 of the scattered coincidence (see FIG. 4 to be described later) from the second intersection point CP2. The measurement line LOR2, for example, corresponds to a straight line joining the radiation position detector 10 and the second intersection point. On the other hand, in a case in which the second intersection point is not present, the coincidence line calculating unit 35 does not calculate a measurement line of the scattered coincidence. In such a case, the data processing unit 3 handles the scattered coincidence as noise. In addition, in a case in which it is determined that several second intersection points are present, the coincidence line calculating unit 35 calculates a measurement line of the scattered coincidence of each of the second intersection points.

The gamma ray generation position acquiring unit 36 acquires a gamma ray generation position using the scattered coincidence from the measurement line of the scattered coincidence and the TOF information of the gamma rays. For example, the gamma ray generation position acquiring unit 36 acquires a gamma ray generation position AP (see FIG. 4 to be described later) on the basis of the calculated measurement line LOR2 of the scattered coincidence and the TOF information of gamma rays. In addition, for example, in a case in which the first intersection line CL1 is present, and at least one of the first and second Compton cone CCA and CCB overlaps the measurement line LOR1 of coincidence, the gamma ray generation position acquiring unit 36 acquires a gamma ray generation position on the basis of the measurement line LOR1 of the coincidence and the TOF information. In a case in which it is determined that the second intersection point is not present, the gamma ray generation position acquiring unit 36 does not acquire a gamma ray generation position using the scattered coincidence. Also in this case, the data processing unit 3 handles the scattered coincidence as noise. In addition, in a case in which it is determined that several second intersection points are present, the gamma ray generation position acquiring unit 36, for example, estimates a gamma ray generation position through a Monte Carlo simulation using a measurement line of the scattered coincidence of each of the second intersection points and the TOF information described above or the like.

Figure 4:
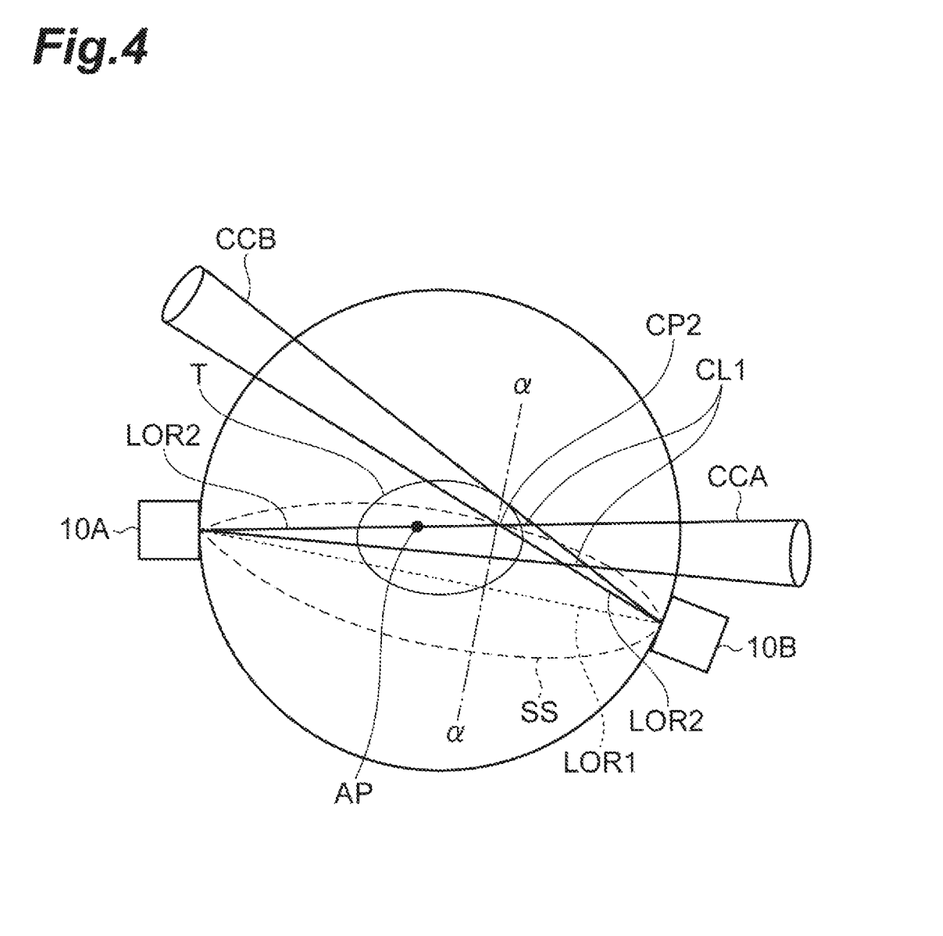
FIG. 4 is a schematic diagram illustrating a method of acquiring a gamma ray generation position using scattered coincidence.
Figure 5:
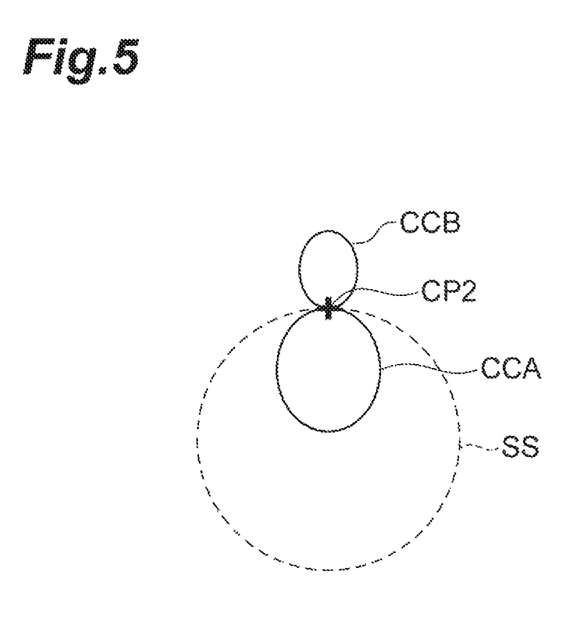
FIG. 5 is a cross-sectional view taken along line α-α illustrated in FIG. 4.
Figure 6:
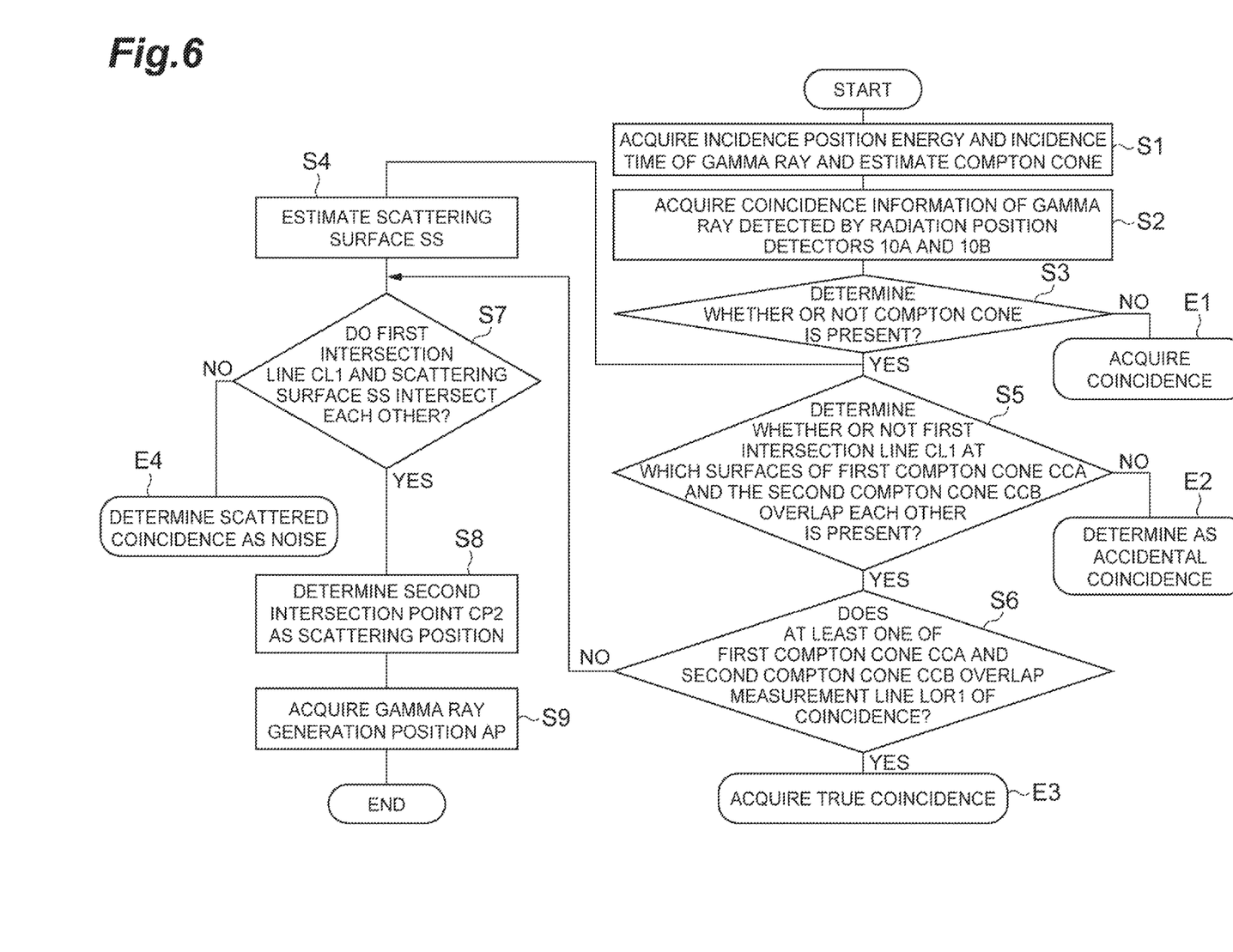
FIG. 6 is a flowchart of a method of acquiring a gamma ray generation position using scattered coincidence.

Next, one example of a method of acquiring a gamma ray generation position using scattered coincidence with the PET device 1 according to this embodiment will be described with reference to FIGS. 4 to 6. FIG. 4 is a schematic diagram illustrating a method of acquiring a gamma ray generation position using scattered coincidence. FIG. 5 is a cross-sectional view taken along line α-α illustrated in FIG. 4. FIG. 6 is a flowchart of a method of acquiring a gamma ray generation position using scattered coincidence. Hereinafter, as illustrated in FIG. 4, a method of acquiring a gamma ray generation position using scattered coincidence in a case in which a pair of radiation position detectors 10A and 10B are used will be described. The radiation position detectors 10A and 10B illustrated in FIG. 4 are not arranged point-symmetrically with respect to a determined line L0 (see FIG. 1B) and are arranged so that a test object T is interposed therebetween. In FIG. 4, radiation position detectors other than the radiation position detectors 10A and 10B are not illustrated.

As illustrated in FIGS. 4 to 6, the radiation position detectors 10A and 10B acquire incidence positions, incidence energy, and incidence times of incident gamma rays and estimate incidence directions of the gamma rays as first and second Compton cones CCA and CCB (Step S1). In Step S1, first, the radiation position detectors 10A and 10B respectively detect incident gamma rays and generates electrical signals (for example, 4ch analog signals, a timing pick-off signal, and the like). Subsequently, the incidence position acquiring unit SP1, the energy acquiring unit SP2, and the incident time acquiring unit SP3 respectively acquire information representing an incidence position, incidence energy, and an incidence time of gamma rays incident on each of the radiation position detectors 10A and 10B from the electrical signals. Subsequently, the Compton cone estimating unit SP4 estimates incidence directions of the gamma rays as a first Compton cone CCA and a second Compton cone CCB on the basis of the energy and the incidence positions of the gamma rays that have been acquired.

Figure 7:
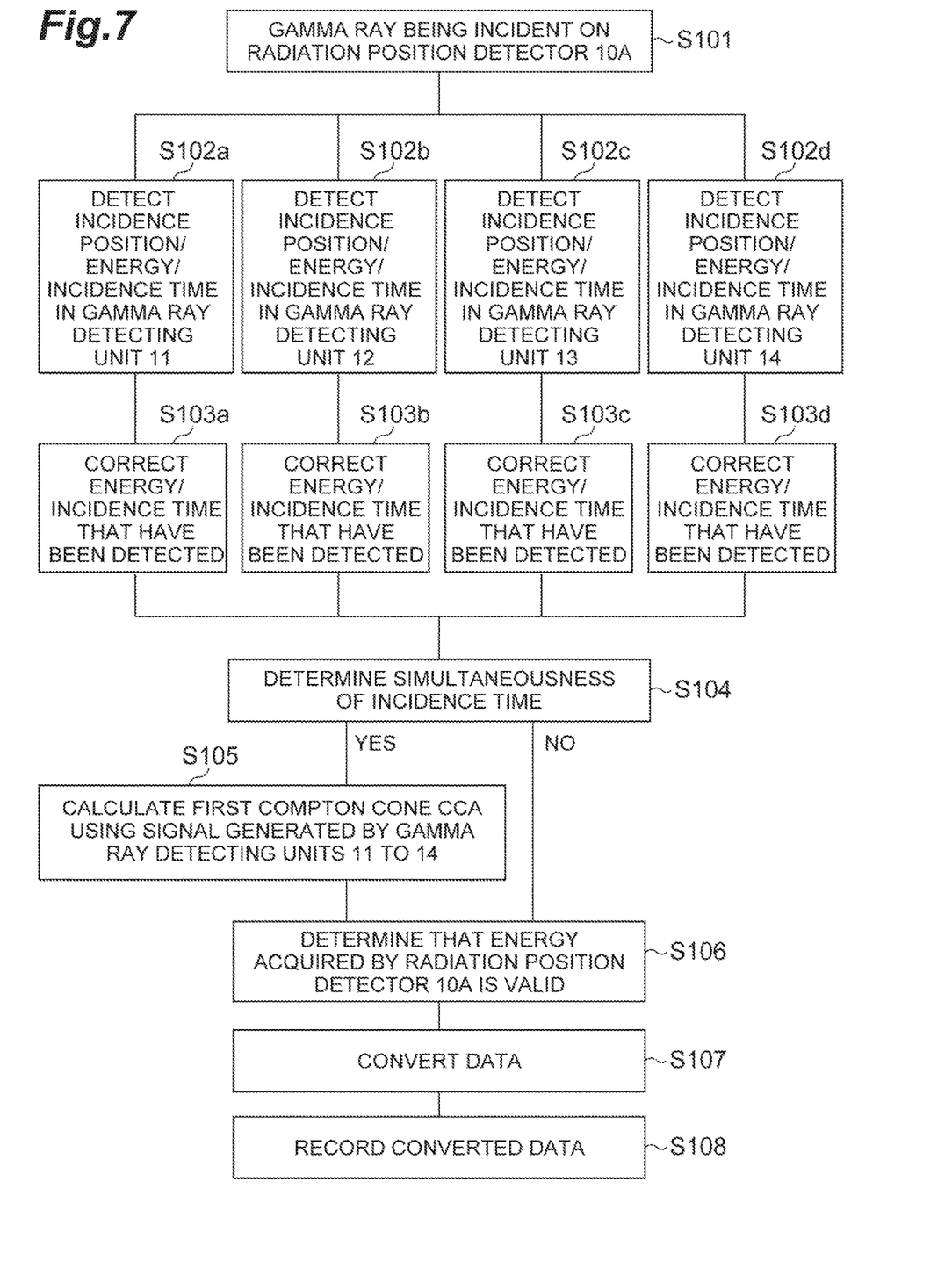
FIG. 7 is a flowchart illustrating a specific example of Step S1 illustrated in FIG. 6.

Here, Step S1 described above will be described in detail with reference to FIG. 7. FIG. 7 is a flowchart illustrating a specific example of Step S1 illustrated in FIG. 6. As illustrated in FIG. 7, first, a gamma ray is incident on the radiation position detector 10A (Step S101). Subsequently, each of the gamma ray detecting units 11 to 14 included in the radiation position detector 10A detects an incidence position, incidence energy, and an incidence time of the incident gamma ray (Steps S102a to S102d). Subsequently, the incidence energy and the incidence time of the gamma ray detected by each of the gamma ray detecting units 11 to 14 are corrected (Step S103a to S103d). Subsequently, the detector signal processing unit SP determines whether or not the incidence times of the gamma ray detecting units 11 to 14 are simultaneous (Step S104). "The incidence times being simultaneous" in Step S104 may not be limited to complete simultaneous times. For example, there may be a time width of about $1 \times 10^{-10}$.

Subsequently, in a case in which it is determined that the incidence times are simultaneous (Step S104: Yes), a first Compton cone CCA is calculated using signals generated by the gamma ray detecting units 11 to 14 (Step S105). Events in which each of incidence times is simultaneous correspond to Compton scattering ranging over the gamma ray detecting units 11 to 14, and, for example, two events are acquired. In addition, in Step S105, a total sum of energy is calculated on the basis of the energy information of each of the events determined to be simultaneous in Step S104. In addition, the Compton cone estimating unit SP4 calculates a first interaction point (FIP) on the basis of the incidence position infatuation and the energy information of the gamma ray received from the gamma ray detecting units 11 to 14. A result of estimation of the incidence direction of the gamma ray incident on the radiation position detector 10A is calculated as a first Compton cone CCA on the basis of this calculated FIP and information of a place at which scattered gamma rays are photo-electrically absorbed.

Subsequently, it is determined whether or not the energy acquired by the radiation position detector 10A is valid (Step S106). In Step S106, it is determined whether or not the calculated total sum of energy is valid on the basis of an energy window. Next, information such as the FIP, the energy total sum information, the incidence time information, and the estimated first Compton cone CCA is converted into digital data (Step S107). In Step S107, the information described above, for example, is transmitted to a buffer and a serial data conversion circuit. Then, the converted data is transmitted to the data processing unit 3 and is recorded (Step S108).

On the other hand, in a case in which it is determined that the incidence times are not simultaneous, (Step S104: No), the process of Step S105 is not performed, and the process of Step S106 is performed. At this time, in Step S106, it is determined whether or not energy acquired from each of the gamma ray detecting units 11 to 14 is valid on the basis of an energy window. An event determined not to be simultaneous, for example, is an event in which gamma rays are photo-electrically absorbed by one of the gamma ray detecting units 11 to 14. In a case in which it is determined that the energy is valid in Step S106, the processes of Steps S107 and S108 are performed. In this way, data of energy regarded as being valid is transmitted to the data processing unit 3 together with the incidence position information and the incidence time information and is recorded.

Also in the radiation position detector 10B, information such as the FIP, the incidence position information, the total sum of energy, and the incidence time information that has been calculated and the estimated second Compton cone CCB according to the flowchart illustrated in FIG. 7 is stored as data.

Referring back to FIGS. 4 to 6, after Step S1 described above, coincidence information of gamma rays detected by the radiation position detectors 10A and 10B is acquired (Step S2). In Step S2, the coincidence acquiring unit 31 determines whether or not detection of gamma rays using the radiation position detectors 10A and 10B configures a coincidence on the basis of the electrical signals transmitted from the radiation position detectors 10A and 10B. In a case in which coincidence information is acquired, a measurement line LOR1 of the coincidence is calculated on the basis of the coincidence information. In addition, TOF information of gamma rays corresponding to a difference between incidence times of the radiation position detectors 10A and 10B is also acquired. On the other hand, in a case in which coincidence information is not acquired, it is determined that gamma rays detected by the radiation position detectors 10A and 10B are not radiation rays generated from the same gamma ray generation position. In this case, processes of Steps S3 to S9 to be described below may not be performed.

Next, presence/absence of first and second Compton cones CCA and CCB is determined by using the information provided from the radiation position detectors 10A and 10B from which the coincidence is acquired (Step S3). In a case in which the first and second Compton cones CCA and CCB are present (Step S3: Yes), the process of Step S4 to be described later is performed. In a case in which at least one of the first and second Compton cones CCA and CCB is not present (Step S3: No), the gamma rays incident on the radiation position detectors 10A and 10B are determined as coincidence including accidental and scattered coincidence acquired also by a general PET device (Step E1). In such a case, the process ends without distinguishing between the accidental coincidence and the scattered coincidence, and accordingly, processes of Steps S4 to S9 to be described later are not performed.

Next, a scattering surface SS of gamma rays is estimated on the basis of the measurement line LOR1 of the coincidence and energy acquired by the radiation position detectors 10A and 10B (Step S4). In Step S4, a scattering angle is calculated on the basis of the energy acquired from the radiation position detector 10A and the energy acquired from the radiation position detector 10B. Then, by drawing all the positions satisfying the scattering angle along the incidence positions in the radiation position detectors 10A and 10B, a scattering surface SS (corresponding to a part denoted by a broken line in FIG. 4) that is a long ellipsoid surface is estimated. Separately from Step S4 described above, it is determined whether a first intersection line CL1 at which the surfaces of the first Compton cone CCA and the second Compton cone CCB overlap each other is present or absent (Step S5). In a case in which it is determined that the first intersection line CL1 is present in Step S5 (Step S5: Yes), Step S6 to be described later is performed. On the other hand, in a case in which it is determined that the first intersection line CL1 is not present in Step S5 (Step S5: No), gamma rays incident on the radiation position detectors 10A and 10B are determined as accidental coincidence (Step E2). In such a case, the process ends without acquiring the gamma ray generation position, and accordingly, processes of Steps S6 to S9 to be described later are not performed. In addition, the processes of Steps S4 and S5 may be performed either at the same timing or at different timings. For example, the process of Step S4 may be performed after the process of Step S5 is performed.

Next, it is determined whether or not at least one of the first Compton cone CCA and the second Compton cone CCB overlaps the measurement line LOR1 of the coincidence (Step S6). In a case in which it is determined that at least one of the first Compton cone CCA and the second Compton cone CCB overlaps the measurement line LOR1 of the coincidence (Step S6: Yes), the coincidence calculated in Step S2 is acquired as a true coincidence (Step E3). After Step E3, the gamma ray generation position acquiring unit 36 acquires a gamma ray generation position on the basis of the TOF information provided from the radiation position detectors 10A and 10B and the measurement line LOR1 of the coincidence. For this reason, processes of Steps S7 to S9 to be described later are not performed.

In a case in which none of the first Compton cone CCA and the second Compton cone CCB overlaps the measurement line LOR1 of the coincidence (Step S6: No), it is determined whether or not a second intersection point CP2 at which the first intersection line CL1 and the scattering surface SS intersect each other is present (Step S7). In a case in which it is determined that the second intersection point CP2 is not present (Step S7: No), it is determined that one of the gamma rays has been scattered a plurality of number of times. In such a case, the data processing unit 3 determines the scattered coincidence as noise (Step E4), and processes of Steps S8 and S9 to be described later are not performed. In addition, the energy of the incident gamma rays becomes low in accordance with the plurality of number of times of scattering, in most of events in which gamma rays are scattered a plurality of number of times inside a subject and arrive at the radiation position detector 10. Incident gamma rays having low energy is regarded as invalid in the energy window determination (Step S106 described above). The ratio of events in which gamma rays are scattered a plurality of number of times and arrive at the radiation position detector 10 is lower than that of events in which gamma rays are scattered once and arrives at the radiation position detector 10 in Step S7. For this reason, the ratio of events in which it is determined that the second intersection point CP2 is not present in Step S7 is also low. Accordingly, Steps S1 to S9 including Steps S8 and S9 to be described later can be regarded as a useful method of estimating a gamma ray generation position AP.

In a case in which it is determined that the second intersection point CP2 is present (Step S7: Yes), the second intersection point CP2 is determined as a position (scattering position) at which one of gamma rays is scattered (Step S8). In Step S8, it is determined that one of the gamma rays has been scatted only once. In addition, the coincidence line calculating unit 35 calculates a measurement line LOR2 of the scattered coincidence on the basis of the second intersection point CP2.

Next, a gamma ray generation position AP of the scattered coincidence is acquired on the basis of the measurement line LOR2 of the scattered coincidence and the TOF information of the gamma rays (Step S9). In Step S9, the gamma ray generation position acquiring unit 36 acquires a gamma ray generation position AP on the basis of the measurement line LOR2 of the scattered coincidence and the TOF information of the gamma rays. The processes of the steps described above are performed for each of a plurality of radiation position detectors 10, whereby the image processing unit 4 can form a tomographic image on the basis of the information of the acquired gamma ray generation position. The image processing unit 4 acquires a tomographic image by performing image reconstruction on the basis of the scattered coincidence regarded as valid by the data processing unit 3, the true coincidence acquired in Step E3, and the coincidence including the scattered and accidental coincidence acquired in Step E1.

Operations and effects according to the method of acquiring a gamma ray generation position using scattered coincidence with the PET device 1 according to this embodiment described above will be described. In this embodiment, not only the first intersection line CL1 at which surfaces of the first Compton cone CCA and the second Compton cone CCB overlap each other but also the second intersection point CP2 that is an intersection point between the scattering surface SS of the gamma rays and the first intersection line CL1 is acquired. Then, this second intersection point CP2 is set as a Compton scattering point of the gamma rays. For this reason, in a case in which the second intersection point CP2 is present, the scattered coincidence can be used as data for acquiring a gamma ray generation position AR In this way, compared to a case in which all the scattered coincidences are simply eliminated as noise, the sensitivity of the radiation position detector 10 is substantially improved. In addition, for example, a gamma ray generation position AP can be estimated using the information of scattered coincidence that is directly measured without requiring calculation through a Monte Carlo simulation in which complex conditions such as the shape of a test object, a ray source distribution, and the like are taken into account or the like. Therefore, according to this embodiment, a high-definition image can be captured in a short time.

In this embodiment, when the first intersection line CL1 is present, and the first intersection line CL1 and the measurement line LOR1 of the coincidence overlap each other, a gamma ray generation position may be acquired on the basis of the TOF information and the measurement line LOR1 of the coincidence.

In this embodiment, when it is determined that the first intersection line CL1 is not present, the determination of presence/absence of a second intersection point CP2, the calculation of a measurement line LOR2 of the scattered coincidence, and the acquisition of a gamma ray generation position AP based on the measurement line LOR2 of the scattered coincidence and the TOF information may not be performed. In such a case, an unnecessary accidental coincidence and scattered coincidence that cannot be estimated can be eliminated as noise, and accordingly, a high-definition image can be captured.

In this embodiment, when it is determined that the second intersection point CP2 is not present, the calculation of a measurement line LOR2 of the scattered coincidence and the acquisition of a gamma ray generation position AP based on the measurement line LOR2 of the scattered coincidence and the TOF information may not be performed. In such a case, an unnecessary scattered coincidence can be eliminated as noise, and accordingly, a high-definition image can be captured.

In this embodiment, each of the radiation position detectors 10 may include gamma ray detecting units 11 to 14 stacked in the incidence direction of the gamma ray, and the gamma ray detecting units 11 to 14 may include scintillators 21a to 21d and optical sensor arrays 22a to 22d, respectively. In such a case, the detection performance of each radiation position detector 10 for a gamma ray can be improved.

In this embodiment, a thickness of a scintillator 21a to 21d included in the gamma ray detecting unit 11 to 14 may be thinner as the scintillator is positioned closer to the subject T. In such a case, a radiation position detector 10 having high time resolution performance can be realized. In addition, the resolution of the Compton cone estimated by the Compton cone estimating unit SP4 can be improved.

In this embodiment, the scintillators 21a to 21d may include the same material, and the material may include an LSO:Ce crystal or an LYSO:Ce crystal. In such a case, the sensitivity of the gamma ray in the scintillator can be improved while the manufacturing cost is reduced.

In this embodiment, a Compton scattering ratio of the scintillator positioned on a side close to the gamma ray generation position may be higher than a Compton scattering ratio of the scintillator positioned on a side far from the gamma ray generation position. In addition, the scintillator positioned on the side close to the gamma ray generation position includes a $LaBr_3$:Ce crystal, and the scintillator positioned on the side far from the gamma ray generation position may include an LSO:Ce crystal or an LYSO:Ce crystal. In such a case, the Compton scattering ratio is improved in the scintillator positioned on the side close to the gamma ray generation position, and the sensitivity of the gamma ray can be improved in the scintillator positioned on the side far from the gamma ray generation position.

In this embodiment, the thicknesses of the scintillators 21a to 21d may be equal to or larger than 2 mm and are equal to or smaller than 5 mm. In such a case, sufficient coincidence timing resolution can be acquired. In addition, the sensitivity of the gamma ray can be secured, and the first and second Compton cones CCA and CCB can be estimated well.

As above, one aspect of the present disclosure has been described in detail on the basis of the embodiment described above. However, one aspect of the present disclosure is not limited to the embodiment described above. One aspect of the present disclosure can be additionally modified in a range not departing from the concept thereof. For example, in the embodiment described above, in a case in which overlapping between the first and second Compton cones occurs at one intersection point, the intersection point can be estimated as a scattering point. In such a case, the second intersection point may not be acquired.

In addition, in the embodiment described above, the second intersection point that is a Compton scattering point of the gamma ray is set as one point but is not limited thereto. There may be several points (two points or the like) as second intersection points between the first intersection line and the scattering surface (in other words, Compton scattering points). In such a case, for example, a gamma ray generation position may be estimated by performing the Monte Carlo simulation described above or the like, as illustrated in the non-patent document 1 described above, having the acquired second intersection points as candidates. In this way, after candidates for the gamma ray generation positions are limited to a small number of candidates in advance, and the Monte Carlo simulation can be performed. For this reason, for example, compared to a case in which a Monte Carlo simulation is simply performed, and a gamma ray generation position is estimated on the basis of lots of candidates, a gamma ray generation position can be estimated with a low load and in a short time. Accordingly, even in a case in which there are several points as second intersection points, the operations and the effects that are similar to those of the embodiment described above are acquired. In addition, in a case in which there are several points as second intersection points, for example, a measurement line of scattered coincidence of each of the second intersection points is calculated in Step S8 described above. Subsequently, in Step S9 described above, the gamma ray generation position acquiring unit 36, for example, may estimate a gamma ray generation position through a Monte Carlo simulation or the like using the measurement line of the scattered coincidence of each second intersection point and the TOF information described above.

In addition, in the embodiment described above, the process of Step S4 may not be necessarily performed. For example, in a case in which the process of Step E2 is performed after Step S5 and a case in which the process Step E3 is performed after Step S6, the process of Step S4 may not be performed.

In this embodiment, the radiation position detector includes four gamma ray detecting units but is not limited thereto. From a viewpoint of improvement of sensitivity for a gamma ray, the radiation position detector may include five or more gamma ray detecting units. In addition, from a viewpoint of the cost, the radiation position detectors may include three or more gamma ray detecting units.

What is claimed is:

1. A method of acquiring a gamma ray generation position using scattered coincidence with a positron emission tomography (PET) device, the method comprising:

detecting gamma rays using a pair of detectors arranged on a periphery of a subject, the subject being interposed between the pair of detectors;

estimating incidence directions of gamma rays detected by the pair of detectors as first and second Compton cones;

acquiring coincidence information of the gamma rays detected by the pair of detectors;

estimating a scattering surface of the gamma rays on the basis of energy information of the gamma rays and a measurement line of the coincidence based on the coincidence information;

determining presence/absence of an intersection line at which surfaces of the first and second Compton cones overlap each other;

determining presence/absence of an intersection point at which the intersection line and the scattering surface intersect each other, when the intersection line is present and none of the first and second Compton cones overlaps the measurement line of the coincidence; and calculating a measurement line of scattered coincidence on the basis of the intersection point and acquiring a gamma ray generation position on the basis of the measurement line of the scattered coincidence and TOF information of the gamma rays, when the intersection point is present.

2. The method of acquiring a gamma ray generation position according to claim 1, wherein a gamma ray generation position is acquired on the basis of the TOF information and the measurement line of the coincidence, when the intersection line is present and at least one of the first and second Compton cones overlaps the measurement line of the coincidence.

3. The method of acquiring a gamma ray generation position according to claim 1, wherein the determining presence/absence of the intersection point, the calculating the measurement line of the scattered coincidence, and the acquiring the gamma ray generation position are not performed when it is determined that the intersection line is not present.

4. The method of acquiring a gamma ray generation position according to claim 1, wherein the calculating a measurement line of the scattered coincidence and the acquiring a gamma ray generation position are not performed when it is determined that the intersection point is not present.

5. A PET device comprising:

detectors arranged on a periphery of a subject, each of the detectors including a signal processing unit, and the subject being interposed between a pair of detectors in the detectors;

a data processing unit configured to acquire a gamma ray generation position on the basis of information detected by the detectors, wherein the signal processing unit includes a Compton cone estimating unit configured to estimate incidence directions of gamma rays incident on the pair of detectors as first and second Compton cones, and wherein the data processing unit includes:

a coincidence acquiring unit configured to acquire coincidence information of the gamma rays detected by the pair of detectors;

a scattering surface estimating unit configured to estimate a scattering surface of the gamma rays on the basis of energy information of the gamma rays and a measurement line of coincidence based on the coincidence information;

an intersection line determining unit configured to determine presence/absence of an intersection line at which surfaces of the first and second Compton cones overlap each other;

an intersection point determining unit configured to determine presence/absence of an intersection point at which the intersection line and the scattering surface intersect each other, when the intersection line is present and none of the first and second Compton cones overlaps the measurement line of the coincidence;

a coincidence line calculating unit configured to calculate a measurement line of scattered coincidence on the basis of the intersection point when the intersection point is present; and a gamma ray generation position acquiring unit configured to acquire a gamma ray generation position using the scattered coincidence on the basis of the measurement line of the scattered coincidence and the TOF information of the gamma rays when the intersection point is present.

6. The PET device according to claim 5, wherein each of the detectors includes gamma ray detecting units stacked in the incidence direction of the gamma rays, and wherein each of the gamma ray detecting units includes a scintillator and an optical sensor array.

7. The PET device according to claim 6, wherein a thickness of the scintillator is thinner as the scintillator is positioned closer to the subject.

8. The PET device according to claim 6, wherein the scintillators includes the same material, and wherein the material includes an LSO:Ce crystal or an LYSO:Ce crystal.

9. The PET device according to claim 6, wherein each of the gamma ray detecting units includes a first scintillator and a second scintillator, the first scintillator being closer to the gamma ray generation position than the second scintillator, and wherein a Compton scattering ratio of the first scintillator is higher than a Compton scattering ratio of the second scintillator.

10. The PET device according to claim 9, wherein the first scintillator includes a $LaBr_3$:Ce crystal, and wherein the second scintillator includes an LSO:Ce crystal or an LYSO:Ce crystal.

11. The PET device according to claim 6, wherein the thicknesses of the scintillators are equal to or larger than 2 mm and are equal to or smaller than 5 mm.

* * * * *